(12) United States Patent
Hsu et al.

(10) Patent No.: US 7,931,379 B2
(45) Date of Patent: Apr. 26, 2011

(54) PROJECTION SYSTEM, PROJECTION LENS MODULE, OPTICAL ACTUATOR AND ITS DRIVING METHOD

(75) Inventors: Fu-Mei Hsu, Taoyuan Hsien (TW); Chin-Wei Kuo, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 378 days.

(21) Appl. No.: 12/142,316

(22) Filed: Jun. 19, 2008

(65) Prior Publication Data

US 2009/0153931 A1    Jun. 18, 2009

(30) Foreign Application Priority Data

Dec. 14, 2007  (TW) .............................. 96147918 A

(51) Int. Cl.
   *G02B 26/08*   (2006.01)
(52) U.S. Cl. ..................... 353/101; 359/223.1
(58) Field of Classification Search .................. 353/101; 359/223.1–226.1
See application file for complete search history.

(56) References Cited

U.S. PATENT DOCUMENTS

| 6,028,689 A | * | 2/2000 | Michalicek et al. | ........ 359/224.1 |
| 7,258,451 B2 | * | 8/2007 | Wang | .............................. 353/99 |

\* cited by examiner

*Primary Examiner* — Seung C Sohn
(74) *Attorney, Agent, or Firm* — Muncy, Geissler, Olds & Lowe, PLLC

(57) ABSTRACT

A driving method of an optical actuator is applied to a projection system. The optical actuator includes a carrier, an optical element and an actuator component. The optical element is disposed at the carrier. The actuator component drives the carrier to rotate an angle. The driving method includes the steps of providing a driving signal having an initial section and a target section, and shifting the optical element between a position driven by the initial section and a position driven by the target section via the actuator component according to a first acceleration-deceleration section and a second acceleration-deceleration section. In addition, an optical actuator, a projection lens module and a projection system are also disclosed.

20 Claims, 6 Drawing Sheets

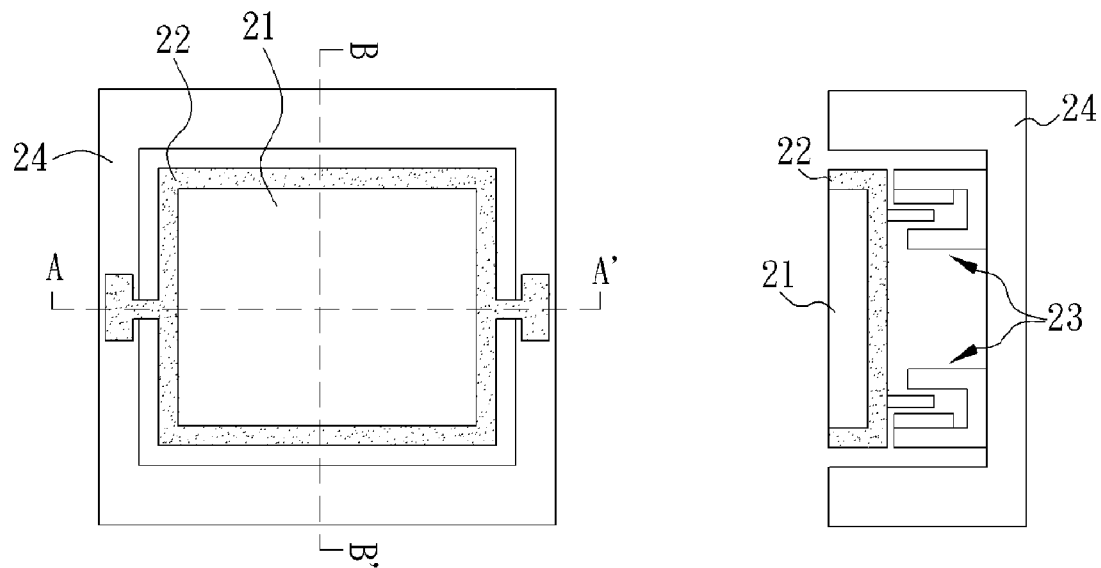
FIG. 3A
FIG. 3C
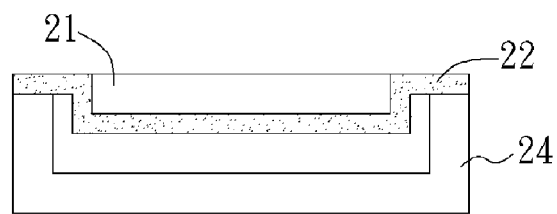
FIG. 3B

PROJECTION SYSTEM, PROJECTION LENS MODULE, OPTICAL ACTUATOR AND ITS DRIVING METHOD

CROSS REFERENCE TO RELATED APPLICATIONS

This Non-provisional application claims priority under 35 U.S.C. §119(a) on Patent Application No(s). 096147918 filed in Taiwan, Republic of China on Dec. 14, 2007, the entire contents of which are hereby incorporated by reference.

BACKGROUND OF THE INVENTION

1. Field of Invention

The present invention relates to a projection system, a projection lens module, an actuator and a driving method of the actuator. More particularly, the present invention relates to a projection system, a projection lens module, an optical actuator and a driving method of the optical actuator.

2. Related Art

In general, an optical actuator is applied to a projection system in order to increase the number of pixels and smooth an image. The projection system includes an image generating device and a projection lens module. The image generating device generates the image according to the technology of digital micro-mirror devices (DMDs), three liquid crystal displays (3LCD) or liquid crystal on silicon (LCoS) panels. Then, the projection lens module projects the image onto a screen. The optical actuator is disposed between the image generating device and the projection lens module, and swings to increase the number of pixels and smooth the image.

The optical actuator may be a reflective or transmissive actuator. The transmissive optical actuator is disposed between the image generating device and the projection lens module. The reflective optical actuator is disposed at the projection lens module. After the image generating device generates the image, the image will be transferred to the optical actuator.

However, the transmissive optical actuator is not commercialized under the spatial limitation and the large swinging angle which has to be 50 times of that of the reflective optical actuator.

There are two conventional methods of controlling the reflective optical actuator to operate. The first method is performed according to pulse width modulation (PWM) in conjunction with the feedback of a photo detector, while the second method is performed by controlling the optical actuator using a specific waveform without the feedback control. When the first method is used, the optical actuator can have lower structural rigidity so that the driving force may be smaller. However, the drawback is that the feedback control is needed.

A driving signal $W_1$ with the specific waveform is shown in FIG. 1 and has an initial section $W_{11}$, a varying section $W_{12}$ and a target section $W_{13}$. The initial section $W_{11}$ drives the optical actuator to keep at one position, the target section $W_{13}$ drives the optical actuator to keep at the other position, and the varying section $W_{12}$ drives the optical actuator to shift between the two positions. When the second method is used, no feedback control is needed, but the optical actuator needs to have higher structural rigidity so that the driving force has to be larger and the damping property is needed to decrease the residual vibration after it has reached the position.

SUMMARY OF THE INVENTION

In view of the foregoing, the present invention is to provide a projection lens module, an optical actuator and a driving method of the optical actuator capable of reducing the driving force and the residual vibration and of being applied to an optical transmissive product to enhance the utility and the performance.

To achieve the above, the present invention discloses a driving method of an optical actuator. The optical actuator includes a carrier, an optical element and an actuator component. The optical element is disposed on the carrier, and the actuator component drives the carrier to rotate an angle. The driving method includes the following steps of: providing a driving signal having an initial section and a target section, and shifting the optical element between a position driven by the initial section and a position driven by the target section via the actuator component according to a first acceleration-deceleration section and a second acceleration-deceleration section.

Herein, each of the first and second acceleration-deceleration sections substantially forms a sine curve and is smoothly connected to the initial section and the target section. The first acceleration-deceleration section, the target section, the second acceleration-deceleration section and the initial section constitute periodicity.

In addition, the driving method can adjust the angle within which the optical element swings by controlling amplitudes of the target section and the initial section.

In addition, the angle rotated by the carrier can be adjusted by controlling amplitudes of the initial section and the target section.

A time period of shifting the optical element is adjusted by controlling time periods of the first and second acceleration-deceleration sections. The residual vibration, generated when the optical element is shifted between the initial section and the target section, is adjusted by controlling time periods and amplitudes of the first and second acceleration-deceleration sections. The optical element can be an optical lens, a flat glass, a light-permeable sheet or a reflective sheet.

To achieve the above, the present invention also discloses an optical actuator including a carrier, a transmissive optical element and an actuator component. The carrier has an opening formed at a central portion thereof. The transmissive optical element is disposed in the opening. The actuator component drives the carrier to rotate an angle. The actuator component receives a driving signal having an initial section and a target section. Then, the actuator component shifts the optical element between a position driven by the initial section and a position driven by the target section according to a first acceleration-deceleration section and a second acceleration-deceleration section.

Herein, the optical actuator further includes a frame, a coil and a magnetic element. The coil is connected to the carrier, and the magnetic element is disposed in the frame. The carrier is disposed corresponding to the frame.

To achieve the above, the present invention further discloses a projection lens module including a lens frame, an optical actuator and a plurality of optical lenses. The optical actuator and the optical lenses are accommodated within the lens frame. The optical actuator has a carrier, a transmissive optical element and an actuator component. The carrier has an opening formed at a central portion thereof. The transmissive optical element is disposed in the opening. The actuator component drives the carrier to rotate an angle. The optical lenses and the transmissive optical element are disposed on an optical path. The actuator component receives a driving signal having an initial section and a target section. The actuator component shifts the optical element between a position driven by the initial section and a position driven by the target section according to a first acceleration-deceleration section and a second acceleration-deceleration section.

Moreover, the present invention further discloses a projection system including an image generating device and a projection lens module. The image generating device is used for generating an image. The projection lens module includes a lens frame, an optical actuator and a plurality of optical lenses. The optical actuator and the optical lenses are accommodated in the lens frame. The optical actuator has a carrier, a transmissive optical element and an actuator component. The carrier has an opening formed at a central portion of the carrier, and the transmissive optical element is disposed in the opening. The image passes through the transmissive optical element, and the actuator component drives the carrier to rotate an angle. The optical lenses and the transmissive optical element are disposed on an optical path. The actuator component receives a driving signal having an initial section and a target section. The actuator component shifts the optical element between a position driven by the initial section and a position driven by the target section according to a first acceleration-deceleration section and a second acceleration-deceleration section.

In the above-mentioned projection system, projection lens module, optical actuator and driving method thereof of the present invention, the transmissive optical element is an optical lens that has a flat shape, and the optical actuator has a cylindrical shape or annular shape. In addition, the projection lens module, optical actuator and driving method thereof can be applied to the projection system such as a front projection system or a rear projection system. The driving signal is outputted from a pulse width modulation (PWM) controller.

As mentioned above, in the projection system, projection lens module, optical actuator and driving method thereof of the present invention, the first and second acceleration-deceleration sections of the driving signal can drive the optical element to shift between two positions. Thus, the driving method based on the acceleration-deceleration sections has the reduced driving force and the reduced residual vibration as compared with the prior art method based on the specific waveform, so that the performance of the optical actuator can be enhanced. In addition, because the required driving force is smaller, the optical actuator having the lower rigidity can be used in the present invention, and the optical actuator can be combined within the lens module, so that the space is saved and the utility can be enhanced.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 3A is an elevation view showing the optical actuator of FIG. 2;

FIG. 3B is a cross-sectional view taken along a line AA' of FIG. 3A;

FIG. 3C is a cross-sectional view taken along a line BB' of FIG. 3A;

DETAILED DESCRIPTION OF THE INVENTION

The present invention will be apparent from the following detailed description, which proceeds with reference to the accompanying drawings, wherein the same references relate to the same elements.

Figure 1:
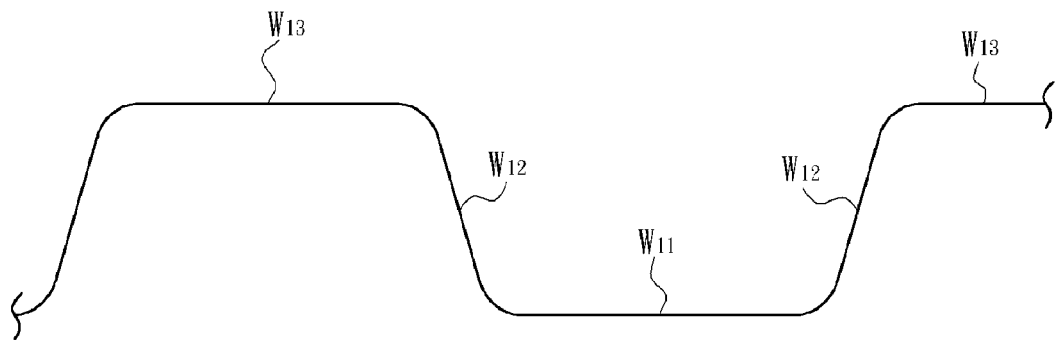
FIG. 1 is a schematic illustration showing a conventional driving signal used in an optical actuator.
Figure 2:
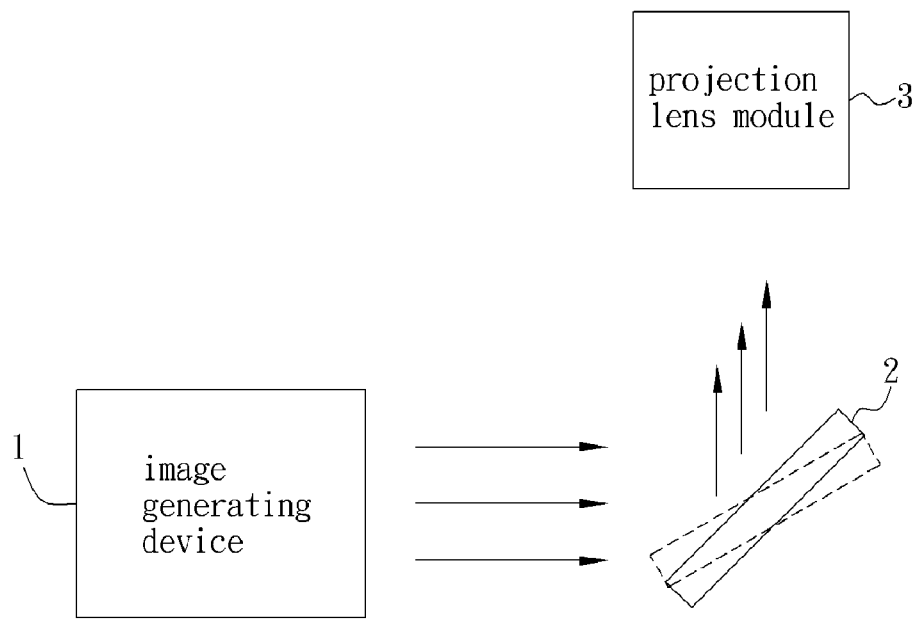
FIG. 2 is a schematic illustration showing a projection system using a driving method of an optical actuator according to an embodiment of the present invention.

A driving method of an optical actuator according to the embodiment of the present invention can be applied to a projection system such as a front projection system or a rear projection system. Referring to FIG. 2, the projection system includes an image generating device 1, an optical actuator 2 and a projection lens module 3. Herein, the optical actuator 2 is a reflective optical actuator, for example.

The image generating device 1 generates an image according to the DMD, 3LCD panels or LCoS panel technology, which is frequently used in the industry. The projection lens module 3 projects the image onto a screen. The optical actuator 2 can swing repeatedly so that the image can be reflected to at least two positions via the optical actuator 2 and enter the projection lens module 3. According to the effect of persistence of vision, the number of pixels can be increased and the image can be smoothed.

FIG. 3A is an elevation view showing the optical actuator 2 of FIG. 2. FIG. 3B is a cross-sectional view taken along a line AA' of FIG. 3A. FIG. 3C is a cross-sectional view taken along a line BB' of FIG. 3A. Referring to FIGS. 3A, 3B and 3C, the optical actuator 2 includes an optical element 21, a carrier 22 and an actuator component 23. The optical element 21 is disposed on the carrier 22, and may be a reflective sheet or a light-permeable sheet including, without limitation to, an optical lens or a flat glass. The actuator component 23 receives a driving signal and drives the carrier 22 to swing an angle. The optical actuator 2 further includes a frame 24 on which the carrier 22 is disposed. The structure of the optical actuator 2 is described only for the illustrative purpose but not the limitative purpose.

Figure 4:
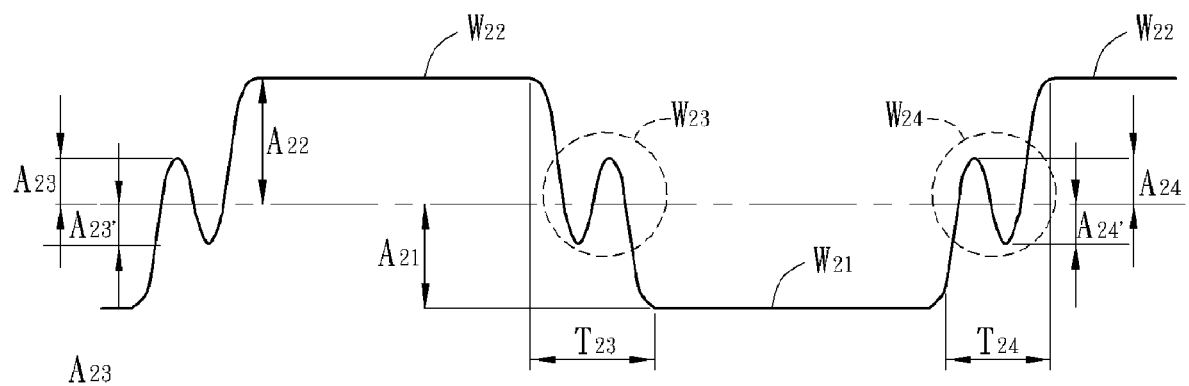
FIG. 4 is a schematic illustration showing a driving signal used in the driving method of the optical actuator according to the embodiment of the present invention.
Figure 5:
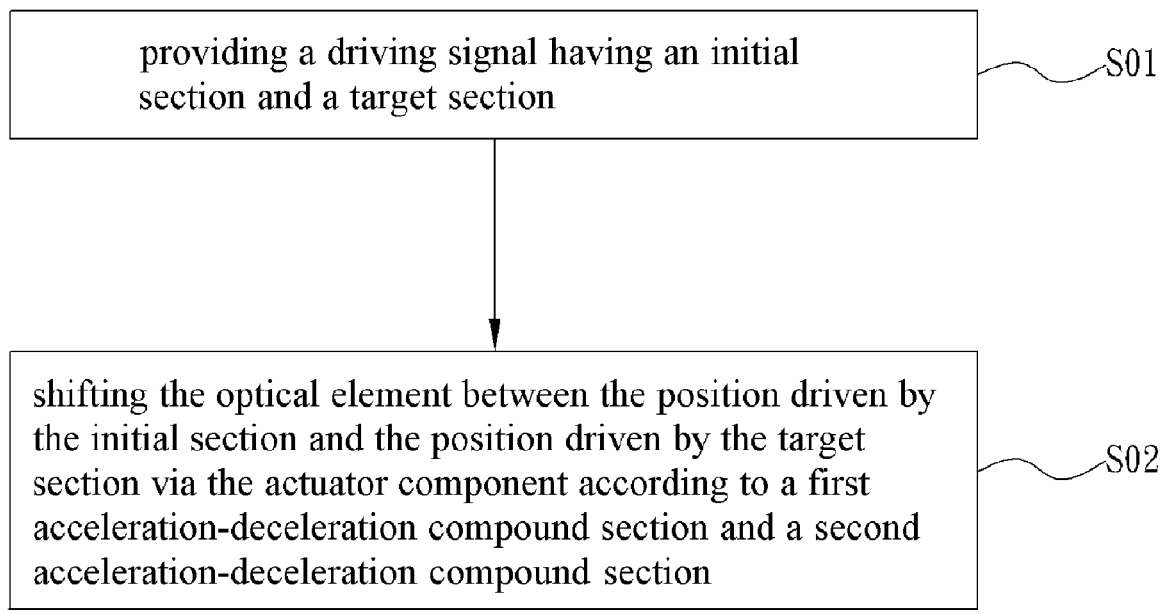
FIG. 5 is a flow chart showing the driving method of the optical actuator according to the embodiment of the present invention.

FIG. 4 is a schematic illustration showing the driving signal used in the driving method of the optical actuator according to the embodiment of the present invention. FIG. 5 is a flow chart showing the driving method of the optical actuator according to the embodiment of the present invention. As shown in FIGS. 3A, 3B, 3C, 4, and 5, the driving signal of the present invention applied to the actuator component 23 is outputted from a PWM controller (not shown), and the driving method thereof mainly includes steps S01 and S02. The driving method of the present invention will be described in the following.

In the step S01, a driving signal $W_2$ having an initial section $W_{21}$ and a target section $W_{22}$ is provided.

Figure 6:
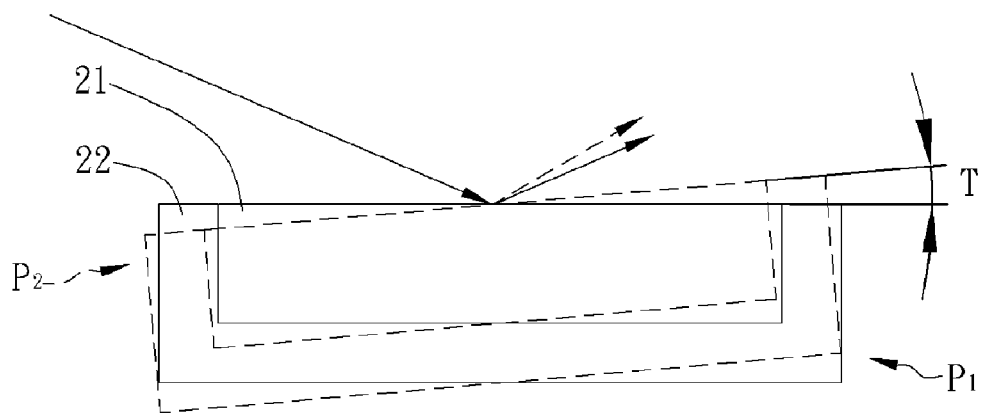
FIG. 6 is a side view showing moving positions of the optical actuator of FIG. 2.

FIG. 6 is a side view showing moving positions of the optical actuator of FIG. 2. As shown in FIGS. 3C, 4 and 6, when the actuator component 23 receives the initial section $W_{21}$ of the driving signal $W_2$, the actuator component 23 drives the carrier 22 to shift the optical element 21 thereon to the position $P_1$. When the actuator component 23 receives the target section $W_{22}$ of the driving signal $W_2$, the actuator component 23 drives the carrier 22 to shift the optical element 21 thereon to the position $P_2$. The carrier 22 and the optical element 21 swing an angle T between the positions $P_1$ and $P_2$. The angle T is determined according to amplitudes of the initial section $W_{21}$ and the target section $W_{22}$. The driving method can adjust the angle T by controlling the amplitudes $A_{22}$ and $A_{21}$.

In the step S02, the optical element 21 is shifted between the position $P_1$ driven by the initial section $W_2$, and the position $P_2$ driven by the target section $W_{22}$ via the actuator component 23 according to a first acceleration-deceleration section $W_{23}$ and a second acceleration-deceleration section $W_{24}$. When the actuator component 23 receives the first acceleration-deceleration section $W_{23}$ or the second acceleration-deceleration section $W_{24}$, it drives the carrier 22 to shift the optical element 21 thereon from the position $P_1$ to the position $P_2$, or from the position $P_2$ to the position $P_1$.

In this embodiment, each of the first and second acceleration-deceleration sections $W_{23}$, $W_{24}$ may be smoothly connected to the initial section $W_2$, and the target section $W_{22}$. Each of the first and second acceleration-deceleration section $W_{23}$, $W_{24}$ may substantially form a single sine curve, a curve composed of sine curves, or another curve composed of other curves. The first acceleration-deceleration section $W_{23}$, the initial section $W_{21}$, the second acceleration-deceleration section $W_{24}$ and the target section $W_{22}$ constitute periodicity. When the actuator component 23 sequentially receives the first acceleration-deceleration section $W_{23}$, the initial section $W_{21}$, the second acceleration-deceleration section $W_{24}$ and the target section $W_{22}$, the carrier 22 accelerates and then decelerates the optical element 21 thereon from the position $P_2$ to the position $P_1$, stops at the position $P_1$, accelerates and then decelerates the optical element 21 thereon from the position $P_1$ to the position $P_2$, and then stops at the position $P_2$.

The carrier 22 and the optical element 21 disposed thereon are firstly accelerated and then decelerated during the conversion, so the driving force of the actuator component 23 and the residual vibration generated after the shifting can be reduced.

As shown in FIG. 4, the driving method further includes the step of adjusting the time period of shifting the optical element 21 by controlling the time periods $T_{23}$ and $T_{24}$ of the first and second acceleration-deceleration sections $W_{23}$, $W_{24}$, respectively. Then, the driving method may further include the step of commonly adjusting the residual vibration generated when the optical element 21 is shifted between the initial section $W_2$, and the target section $W_{22}$ by controlling the time period $T_{23}$ and the amplitudes $A_{23}$ and $A_{23}'$ of the first acceleration-deceleration section $W_{23}$, and the time period $T_{24}$ and the amplitudes $A_{24}$ and $A_{24}'$ of the second acceleration-deceleration section $W_{24}$.

The driving method of the above-mentioned embodiment can be applied to the reflective optical actuator. Of course, the driving method of the present invention can also be applied to the transmissive optical actuator disposed in the projection lens module. Illustrations will be made with reference to FIGS. 7, 8A, 8B and 8C.

Figure 7:
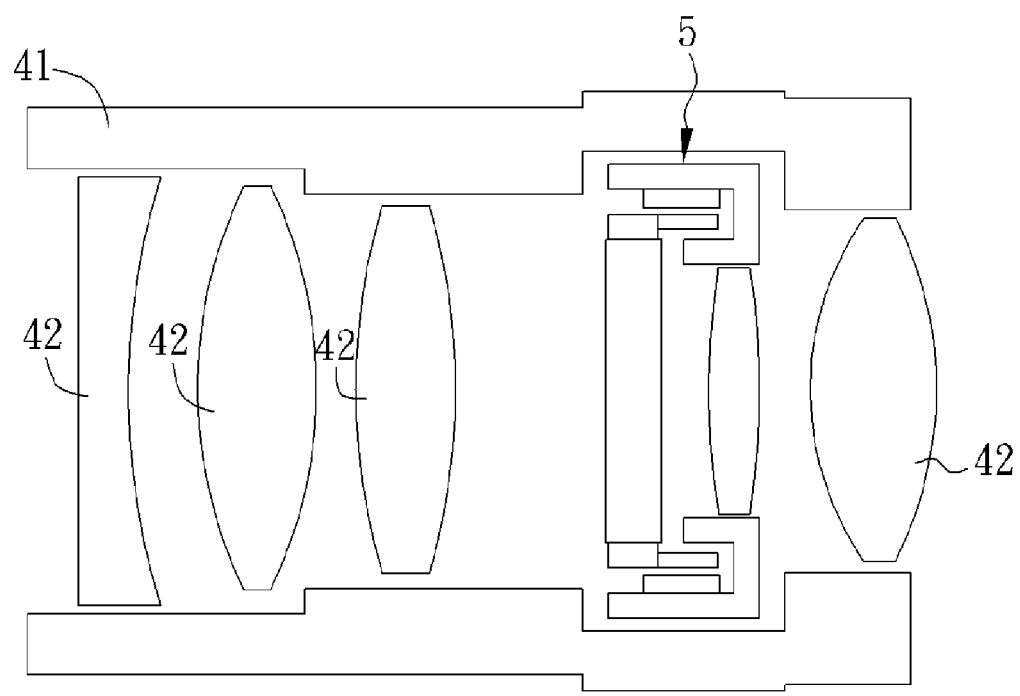
FIG. 7 is a cross-sectional view showing a projection lens module according to the other embodiment of the present invention.

FIG. 7 is a cross-sectional view showing a projection lens module 4 according to the other embodiment of the present invention. Referring to FIG. 7, the projection lens module 4 according to the other embodiment of the present invention includes a lens frame 41, an optical actuator 5 and a plurality of optical lenses 42. In this embodiment, the optical actuator 5 is a transmissive optical actuator, for example. Therefore, the optical actuator 5 and the optical lens 42 are accommodated within the lens frame 41 and are disposed on an optical path.

Figure 8A:
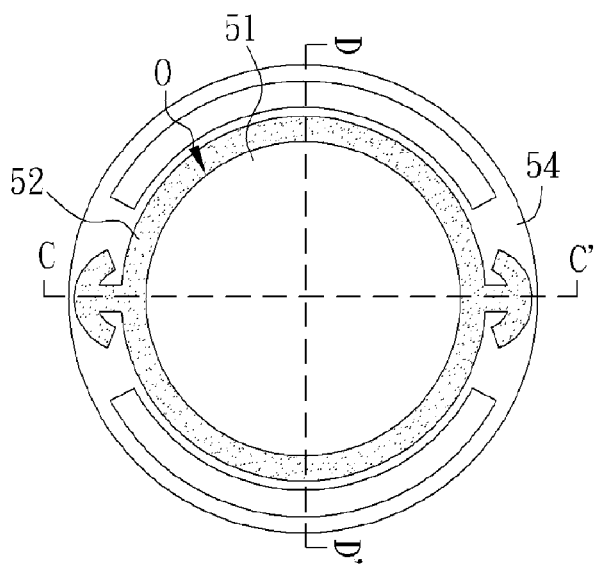
FIG. 8A is an elevation view showing another optical actuator according to the other embodiment of the present invention.
Figure 8C:
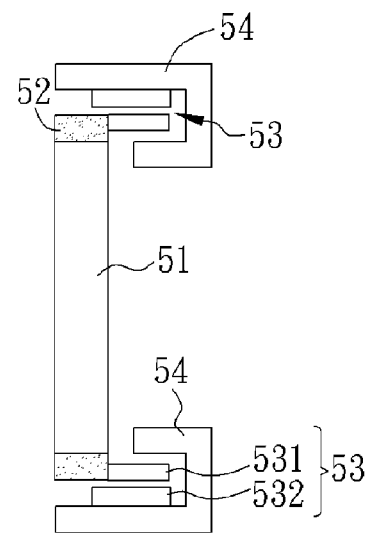
FIG. 8C is a cross-sectional view taken along a line DD' of FIG. 8A.
Figure 8B:
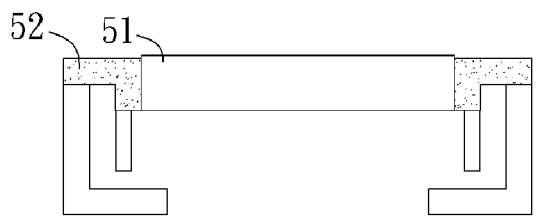
FIG. 8B is a cross-sectional view taken along a line CC' of FIG. 8A.

FIG. 8A is an elevation view showing another optical actuator 5 according to the other embodiment of the present invention. FIG. 8B is a cross-sectional view taken along a line CC' of FIG. 8A. FIG. 8C is a cross-sectional-view taken along a line DD' of FIG. 8A. Referring to FIGS. 8A, 8B and 8C, the optical actuator 5 has a cylindrical shape and includes a transmissive optical element 51, a carrier 52 and an actuator component 53. The transmissive optical element 51 can be an optical lens having a flat shape. A central portion of the carrier 52 has an opening O, and the transmissive optical element 51 is disposed in the opening O. The actuator component 53 drives the carrier 52 to rotate an angle.

The optical actuator 5 further includes a frame 54, the carrier 52 can be disposed corresponding to the frame 54, and the frame 54 can be a magnetically conductive element. The actuator component 53 has a coil 531 and a magnetic element 532 disposed corresponding to the coil 531. The coil 531 is connected to the carrier 52, and the magnetic element 532 is disposed at the frame 54. The driving signal can be applied to the coil 531 to drive the carrier 52 to swing according to the electromagnetic effect.

In general, the swinging angle of the transmissive optical element 51 is larger than that of the reflective optical element to achieve the same effect. Regarding to this, the driving method of this embodiment can reduce the driving force, so that the required force for driving the transmissive optical element 51 can be easily reached. Thus, the optical actuator 5 can be combined within the lens module, the space can be saved and the utility can be enhanced.

The projection lens module 4 of this embodiment can be applied to a projection system, such as a front projection system or a rear projection system. In addition, the projection system further includes an image generating device for generating an image, which may pass through the transmissive optical element 51. The image generating device includes, for example, DMDs, three LCD panels, or an LCoS panel.

In summary, the first acceleration-deceleration section and the second acceleration-deceleration section of the driving signal can drive the optical element to shift between two positions in the present invention. It is verified that the driving method based on the acceleration-deceleration section has the reduced driving force and the reduced residual vibration as compared with the prior art method based on the specific waveform, so that the performance of the optical actuator can be enhanced. In addition, because the required driving force is smaller, the optical actuator having the lower rigidity can be used in the present invention, and the optical actuator can be combined within the lens module, so that the space is saved and the utility can be enhanced.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A driving method of an optical actuator, the optical actuator comprising a carrier, an optical element and an actuator component, the optical element being disposed on the carrier, the actuator component driving the carrier to rotate an angle, the driving method comprising steps of:

providing a driving signal having an initial section, a target section, a first acceleration-deceleration section, and a second acceleration-deceleration section; and shifting the optical element between a position driven by the initial section and a position driven by the target section via the actuator component according to the first acceleration-deceleration section and the second acceleration-deceleration section.

2. The method according to claim 1, wherein each of the first and second acceleration-deceleration sections substantially forms a sine curve.

3. The method according to claim 1, wherein the first or second acceleration-deceleration section is smoothly connected to the initial section and the target section.

4. The method according to claim 1, wherein the first acceleration-deceleration section, the target section, the second acceleration-deceleration section and the initial section constitute periodicity.

5. The method according to claim 1, wherein the optical element swings within an angle between the position driven by the initial section and the position driven by the target section.

6. The method according to claim 5, wherein the angle is adjusted by controlling amplitudes of the target section and the initial section.

7. The method according to claim 1, wherein a time period of shifting the optical element is adjusted by controlling time periods of the first and second acceleration-deceleration sections.

8. The method according to claim 1, wherein residual vibration, generated when the optical element is shifted between the initial section and the target section, is adjusted by controlling time periods and amplitudes of the first and second acceleration-deceleration sections.

9. The method according to claim 1, wherein the optical element is an optical lens, flat glass, light-permeable sheet or reflective sheet.

10. An optical actuator comprising:
a carrier having an opening;
an optical element disposed in the opening of the carrier; and
an actuator component for driving the carrier to rotate an angle, wherein the actuator component receives a driving signal with an initial section, a target section, a first acceleration-deceleration section, and a second acceleration-deceleration section, and the actuator component shifts the optical element between a position driven by the initial section and a position driven by the target section according to the first acceleration-deceleration section and the second acceleration-deceleration section.

11. The optical actuator according to claim 10, further comprising a frame, a coil connected to the carrier; and a magnetic element disposed in the frame.

12. The optical actuator according to claim 11 wherein the frame is a magnetically conductive element.

13. A projection system, comprising:
an image generating device for generating an image; and
a projection lens module comprising:
a lens frame,
an optical actuator accommodated in the lens frame and having a carrier, an optical element and an actuator component, wherein the carrier has an opening, the optical element is disposed in the opening, the image passes through the optical element, and the actuator component drives the carrier to rotate an angle, and
a plurality of optical lenses accommodated in the lens frame,
wherein the optical lenses and the optical element are disposed on an optical path, the actuator component receives a driving signal having an initial section, a target section, a first acceleration-deceleration section, and a second acceleration-deceleration section, and the actuator component shifts the optical element between a position driven by the initial section and a position driven by the target section according to the first acceleration-deceleration section and the second acceleration-deceleration section.

14. The projection system according to claim 13, wherein the optical actuator further comprises a frame, and the actuator component comprises a coil connected to the carrier and a magnetic element disposed in the frame.

15. The projection system according to claim 14, wherein the carrier is disposed corresponding to the frame.

16. The projection system according to claim 13, wherein the optical element is a transmissive optical lens or flat glass.

17. The projection system according to claim 13, wherein the optical actuator has a cylindrical shape or annular shape.

18. The projection system according to claim 13, wherein the image generating device at least comprises a digital micro-mirror device (DMD), three liquid crystal panels or a liquid crystal on silicon (LCoS) panel.

19. The projection system according to claim 13 being a front projection system or a rear projection system.

20. The projection system according to claim 13, wherein the driving signal is outputted from a pulse width modulation controller.

* * * * *